(12) United States Patent
Liu et al.

(10) Patent No.: US 11,188,950 B2
(45) Date of Patent: Nov. 30, 2021

(54) AUDIENCE EXPANSION FOR ONLINE SOCIAL NETWORK CONTENT

(71) Applicant: Microsoft Technology Licensing, LLC, Redmond, WA (US)

(72) Inventors: Haishan Liu, Sunnyvale, CA (US); David Merrill Pardoe, Mountain View, CA (US); Kun Liu, Sunnyvale, CA (US); Manoj Rameshchandra Thakur, Sunnyvale, CA (US); Kancheng Cao, Palo Alto, CA (US); Chongzhe Li, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 15/253,702

(22) Filed: Aug. 31, 2016

(65) Prior Publication Data
US 2018/0060915 A1   Mar. 1, 2018

(51) Int. Cl.
*G06Q 30/02* (2012.01)
*G06Q 50/00* (2012.01)

(52) U.S. Cl.
CPC ..... *G06Q 30/0269* (2013.01); *G06Q 30/0254* (2013.01); *G06Q 30/0261* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,152,063 | B2* | 12/2006 | Hoashi | G06F 16/335 |
| 9,065,727 | B1* | 6/2015 | Liu | H04L 67/22 |
| 2012/0066072 | A1* | 3/2012 | Kanigsberg | G06Q 30/02 705/14.66 |
| 2013/0055320 | A1* | 2/2013 | Mitchell | H04N 21/2146 725/76 |
| 2014/0258400 | A1* | 9/2014 | Paritosh | H04L 51/32 709/204 |
| 2016/0055320 | A1* | 2/2016 | Wang | G16H 15/00 705/2 |

(Continued)

OTHER PUBLICATIONS

Author(S):Androutsopoulos, Jannis . Title: Languaging when context collapse Journal: Elsevier [online]. Publication date: Sep. 2014 .[retrieved on:Sep. 3, 2021]. Retrieved from the Internet: < URL: https://www.sciencedirect.com/science/article/pii/S2211695814000257> (Year: 2014).*

*Primary Examiner* — George Chen
*Assistant Examiner* — Alfred H Tsui
(74) *Attorney, Agent, or Firm* — Schwegman Lundberg & Woessner, P.A.

(57) ABSTRACT

The present disclosure describes various embodiments of methods, systems, and machine-readable mediums which may be used in conjunction with a campaign for distributing content to users of the social network. Among other things, embodiments of the present disclosure provide a number of advantages over conventional systems for content distribution, including a simplified targeting process and increased reach (i.e. distribution) for content providers among users of a social network, as well as improving the utilization of an inventory of content and higher and more efficient engagement with such content by users of the social network.

20 Claims, 5 Drawing Sheets

(56) References Cited

U.S. PATENT DOCUMENTS

| | | | |
|---|---|---|---|
| 2016/0232575 A1* | 8/2016 | Kirti | G06Q 30/0269 |
| 2017/0011420 A1* | 1/2017 | Sullivan | G06N 20/00 |
| 2017/0024455 A1* | 1/2017 | Powell | G06F 16/285 |
| 2017/0330239 A1* | 11/2017 | Luo | G06Q 30/0269 |

* cited by examiner

AUDIENCE EXPANSION FOR ONLINE SOCIAL NETWORK CONTENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information.

For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes may be referred to as "business networks" or "professional networks").

Online social network platforms provide a variety of information and content to users of the social network, such as articles on various topics, updates related to a user and individuals within the user's network, job opportunities and other advertisements, news stories, and the like. To help ensure the content within a user's social network feed (or other content delivery platform) is of interest to the user and reaches a wide selection of users, embodiments of the present disclosure match content with particular users within the social network and expand the audience for content by identifying additional users.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
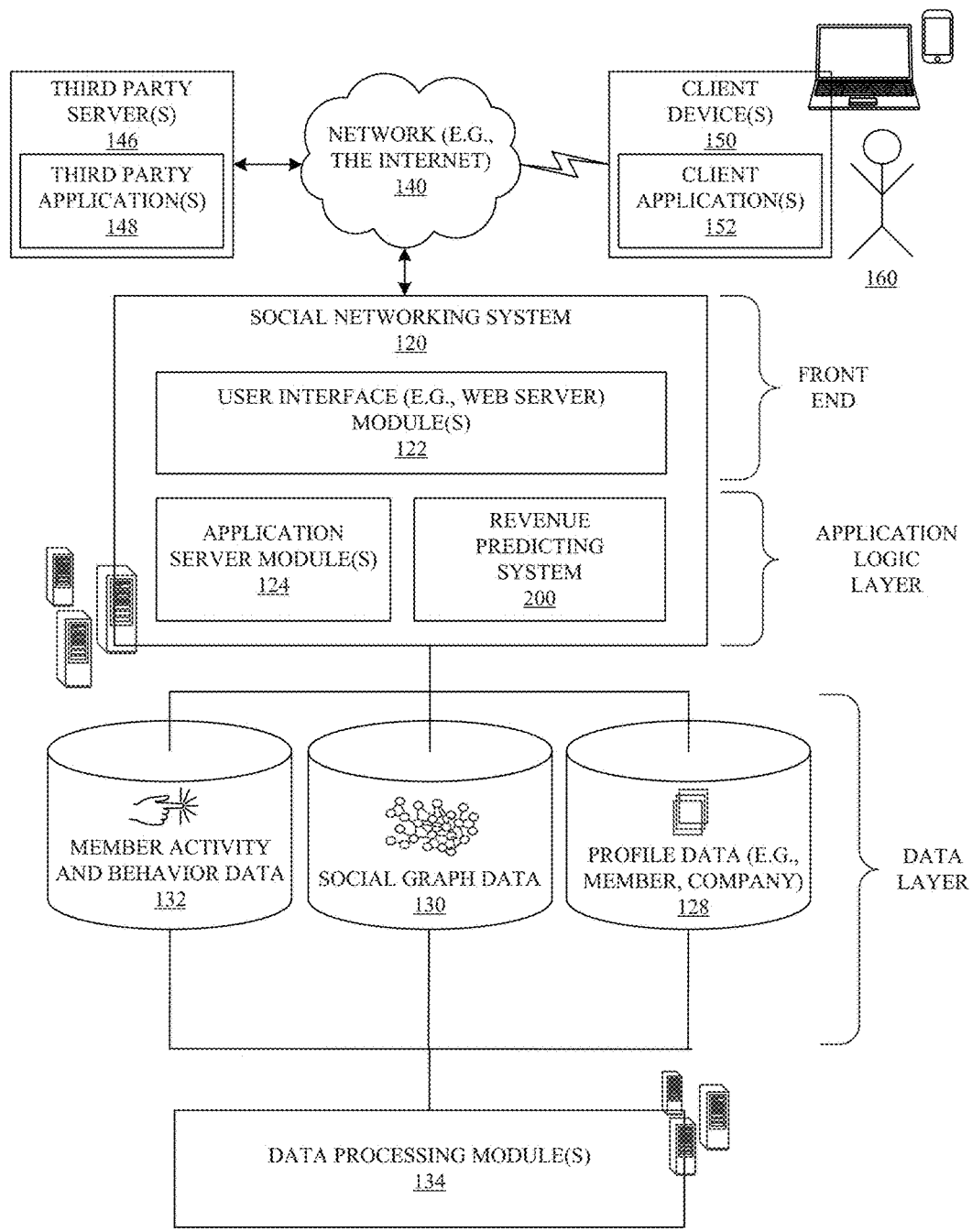
FIG. 1 is a block diagram illustrating a client-server system, according to various exemplary embodiments.

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the embodiments in the present disclosure are not limited to a social or business networking service.

Embodiments of the present disclosure discussed herein may be used in conjunction with a campaign for distributing content to users of the social network. As described below, various embodiments may utilize campaign-agnostic expansion methods, campaign-aware expansion methods, or combinations of the two. Among other things, embodiments of the present disclosure provide a number of advantages over conventional systems for content distribution, including a simplified targeting process and increased reach (i.e. distribution) for content providers among users of a social network, as well as improving the utilization of an inventory of content and higher and more efficient engagement with such content by users of the social network.

In general, the distribution of various content on online social network platforms involves the interaction between three groups: users browse and interact with content on the social networking website and (in the process) they express their intentions and preferences; content providers seek to display content to users; and the social network provides the platform for displaying the content while matching the content to a particular user to help ensure the content is relevant to the user.

Content in a social network is typically displayed to a user on an Internet web page in, for example, a user's "news feed" (which is a collection or sequence of articles, updates, and other content) as well as in other parts of the page, such as the top of the page or right column. In many cases, content providers may provide the characteristics of users they wish to reach with their content to the social network to help the social network match the content with appropriate users.

Online social networks provide opportunities to target users with particular content distinct from other Internet platforms. For example, unlike the sponsored search model for advertising on Internet search engines, where advertisers simply target a list of keywords that they deem relevant to their advertising campaign, advertisers on online social networks can target audiences based on comprehensive demographic targeting options to precisely define the desired audience due to the amount of data the social network has for each user (e.g., stored in the user's social network profile). For example, an advertiser on a social network can reach all software engineers having the Machine Learning and Java skills who work in a company located in the U.S. with fewer than 500 employees. Likewise, an author/provider of a nuclear physics article written in German can target members of the social network who speak German and have degrees in nuclear physics.

However, even with this targeting ability, advertisers and other content providers usually cannot cover all relevant demographic attributes related to the desired product or service. Indeed, the cardinality of most targeting attributes is well beyond tens of thousands (e.g., titles and skills), and some even rise into multiple millions (e.g., company and group). This makes it costly for content providers to identify the attributes they wish to target with their campaigns.

To address this problem (and others) embodiments of the present disclosure may be used to help content providers on an online social network increase the reach of their content-distribution campaigns. As discussed in more detail below, embodiments of the disclosure may be used to automatically enlarge the original target audience (also referred to herein as the "exact audience") to include additional users who bear some degree of similarity to the users in the original audience. For example, if a content distribution campaign for a white paper discussing online marketing data targets members with the skill "Online Advertising," the campaign might also be expanded to members who list the skill "Interactive Marketing" on their profiles. Accordingly, embodiments of the disclosure can help content providers reach their desired target audience with less effort setting up campaigns.

FIG. 1 illustrates an exemplary client-server system that may be used in conjunction with various embodiments of the present disclosure. The social networking system 120 may be based on a three-tiered architecture, including (for example) a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions, Various additional functional modules and engines may be used with the social networking system illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the embodiments of the present disclosure are not limited to such architecture.

As shown in FIG. 1, the front end layer consists of a user interface module(s) (e.g., a web server) 122, which receives content requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems.

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client devices) 150. The user(s) 160 may not be part of the networked environment, but may be associated with client device(s) 150.

As shown in FIG. 1, the data layer includes several databases, including a database 128 for storing data for various entities of a social graph. In some exemplary embodiments, a "social graph" is a mechanism used by an online social networking service (e.g., provided by the social networking system 120) for defining and memorializing, in a digital format, relationships between different entities people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

In some embodiments, when a user initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some exemplary embodiments, members may receive advertising targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

Further, as shown in FIG. 1, a data processing module 134 may be used with a variety of applications, services, and features of the social networking system 120. The data processing module 134 may periodically access one or more of the databases 128, 130, and/or 132, process (e.g., execute batch process jobs to analyze or mine) profile data, social graph data, member activity and behavior data, and generate analysis results based on the analysis of the respective data. The data processing module 134 may operate offline. According to some exemplary embodiments, the data processing module 134 operates as part of the social networking system 120. Consistent with other exemplary embodiments, the data processing module 134 operates in a separate system external to the social networking system 120. In some exemplary embodiments, the data processing module 134 may include multiple servers of a large-scale distributed storage and processing framework, such as Hadoop servers, for processing large data sets. The data processing module 134 may process data in real time, according to a schedule, automatically, or on demand. In some embodiments, the data processing module 134 may perform (alone or in conjunction with other components or systems) the functionality of method 200 depicted in FIG. 2A and described in more detail below.

Additionally, a third application(s) 148, executing on a third party server(s) 146, is shown as being communicatively coupled to the social networking system 120 and the client device(s) 150. The third party server(s) 146 may support one or more features or functions on a website hosted by the third party.

Figure 2A:
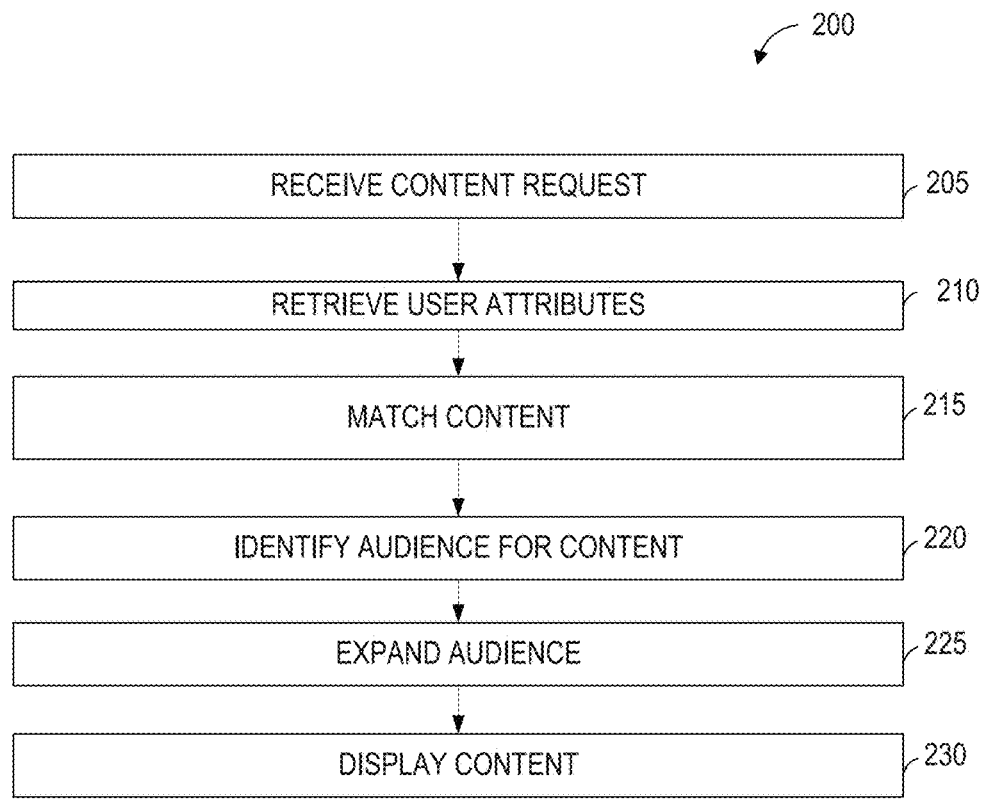
FIG. 2A is a flow diagram of an exemplary method according to various exemplary embodiments.

FIG. 2A illustrates an exemplary method 200 for audience expansion for online social network content according to various aspects of the present disclosure. Embodiments of the present disclosure may practice the steps of method 200 in whole or in part, and in conjunction with any other desired systems and methods. The functionality of method 200 may be performed, for example using any combination of the systems depicted in FIGS. 1, 3, and/or 4.

In this example, method 200 includes receiving a content request (205), retrieving user attributes (210), matching content to one or more users (215), identifying an initial ("exact") audience for the content (220), expanding the audience (225), and displaying the content (230).

Embodiments of the present disclosure may receive a content request (205) in a variety of ways. In some exemplary embodiments, a content request is generated in response to a user visiting and/or interacting with an Internet web page of a social network. In some embodiments, the content request may be based on dynamic portions of the web page (e.g., that can be filled with articles, advertising, or other content) in order to fill such portions with appropriately-formatted content. Receiving the content request (205) may also include receiving targeting information from the provider of the content that can be used in matching (215) the content to various users of the social network. For example, such targeting information may include one or more of: a job title (e.g., "software engineer"), a skill (e.g., "programming"), a topic (e.g., "software engineering"), an organization (e.g., a company, professional organization, etc.), an organization size, demographic information (e.g., age, gender, etc.), behavioral information (e.g., web pages visited by a user, time spent viewing a web page, links clicked on by a user, etc.), and location information.

In some embodiments, content from one or more content distribution campaigns—those not directly targeted at this user, but with an audience that looks alike—are added to the eligible campaigns of the user. Expansion of the audience for content is described in more detail below.

In response to the content request (205), attributes for the user viewing the web page are retrieved (210) and matched (215) with the targeting criteria for one or more content items. Embodiments of the present disclosure may retrieve and utilize a variety of different user attributes from the user's profile. Additionally, some attributes may be determined based on the profile attributes or retrieved from sources other than the user's profile. In some embodiments, for example, each user attribute (or "entity") may be modeled as a structured (multi-fielded) document. A plurality of types of fields are retrieved for each entity, including n-grams/phrases, standardized named data types (e.g., industry), derived data types, and network proximities.

In one particular example, embodiments of the disclosure may be used to find similarities between companies associated with different users. In this example, the entities of interest are thus companies. N-gram/phrase fields can be extracted from free text contents of the company meta data, such as description or headline. The n-grams can be stemmed and a small set of stop words are dropped. Phrases may then be identified (e.g., using a dictionary) and standardized named data types extracted by dedicated classifiers for various predefined types, such as industry type and company size. Derived data types for a company may include additional attributes inferred about the company based on the commonality of its employees or followers. For example, an Internet company may have derived skills such as "Network Development" or "Software Engineering" because of the prevalence of those skills among its employees or followers. Network proximities include other related companies determined through various user-company interactions. For example, people who viewed/followed/worked for this company also viewed/followed/worked for other companies.

Table 1 shows an example of the features that may be extracted for the company LINKEDIN:

TABLE 1

Example features extracted for LINKEDIN as a company

| Type | Field | Term Values |
|---|---|---|
| n-gram/phrase | headline | Internet, professional, Social Network |
| | description | connection, productive, Talent Solution |
| standardized | industry | Internet |
| | type | public company |
| | company size | 5001-10,000 employees |
| derived | skills | Software Engineering, Management, Marketing |
| | interests | professional identity, jobs, software development |
| proximities | view-browsemap | FACEBOOK, TWITTER, PINTEREST |
| | occupation-browsemap | GOOGLE, YAHOO, FACEBOOK |

In some embodiments, retrieving a user's profile attributes may include adding a set of expanded/additional attributes to the attributes in the user's profile, thus making the user targetable by more content distribution campaigns.

Embodiments of the present disclosure may expand the audience for content based upon user attributes (also referred to herein as "campaign-agnostic" expansion), based on lookalike modeling on top of content distribution campaigns' original target audience, (also referred to herein as "campaign-aware" expansion). For both the campaign-agnostic and campaign-aware approaches, repeatedly matching content across many users can be prohibitively expensive computationally and it can be difficult to access all the latest data for every feature. Accordingly, some embodiments may be adapted to perform some functionality in an online fashion (i.e., updating relatively frequently, such as in real-time or near-real-time as the feature changes) while other functionality can be performed in an offline fashion (i.e., updated relatively infrequently and/or stored in a database for periodic retrieval).

For instance, referring to FIG. 2A, an example of the campaign-agnostic and campaign-aware frameworks is shown. In this example, both frameworks make use of batch processing carried out in an offline fashion, as illustrated in the "offline processes" (the white boxes) as well as functionality carried out in real-time or near-real-time as "online processes" (the shaded boxes).

Referring again to FIG. 2A, the system matches (215) content with a user based on the attributes of the user and identifies an audience for the content (220) based on the results of the matching. For example, as introduced above, when a content provider creates a content distribution campaign, the provider may provide various information to the social network regarding each piece of content, such as the format of the content, the topic of the content (also known as "the creative" for advertising content), a daily and/or lifetime budget, a bid, and the targeting to use. Bids may either be per thousand impressions (e.g., cost per mille "CPM" or cost per click "CPC").

To specify targeting, the content provider may select from choices within a number of categories, such as location, age, company name, and skills. Within each category, the advertiser may be presented with a set of standardized choices, and can select options to include and exclude. These options may be received (205) as part of the content request.

In some embodiments, the included selections in each category are logically ORed together, and everything is then logically ANDed together, producing a targeting string that represents a logical formula in conjunctive normal form. For example, a targeting string might be:

(location="USA" OR location="Canada") AND (location !="Calif.") AND (age="18-24" OR age="25-34") AND (seniority !="unpaid") AND (seniority !="training")

Once the targeting has been specified, users are added to the audience for the content based on satisfying the targeting criteria are identified (220) for the audience. Such matching may be based on, for example, a user matching at least a predetermined number of criteria. Matching the user to content may also be based on determining a score (e.g., determined based on weighting different criteria) for the user that meets or exceeds a predetermined threshold. The estimated size of the audience and a suggested bid may be shown to assist the content provider. The content provider may also be given an option to enable the audience expansion (225) features of the present disclosure, and may change this setting at any time.

Figure 2B:
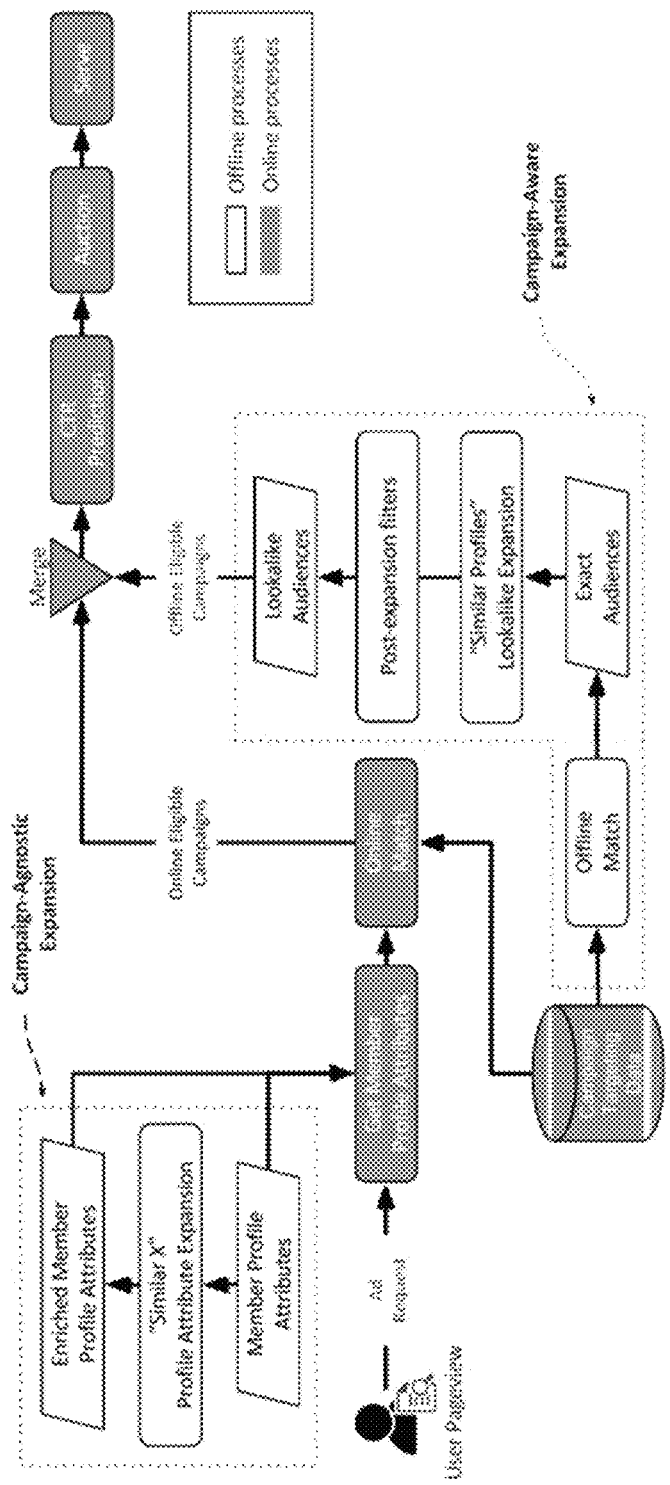
FIG. 2B is a work flow diagram depicting aspects of audience expansion according to various exemplary embodiments.

As noted above, the initial/original audience for a content delivery campaign may be referred to as the "exact audience" and (as shown in FIG. 2B) some processing may be performed "offline," including the matching of users to content (215) and identifying audiences for content (220). For example, an offline process may identify the exact target audiences for all active campaigns that have enabled expansion by applying their targeting criteria in batch mode (e.g., the "Offline Match" block produces the "Exact Audience" block in FIG. 2B).

In some embodiments, the campaign-aware expansion may be an offline process that runs multiple times per day and takes a snapshot of a production database (including campaign definitions) as input. If a content provider updates a campaign's targeting after the snapshot is taken, the expanded audience generated may not be appropriate for that campaign, at least until the next time the expansion process is run. To mitigate the potential discrepancy, embodiments of the present disclosure may perform an online/offline synchronization that uses timestamped match results to determine the display of content to a user.

In one particular example, the offline process generates a timestamp along with each output record indicating the time when the input snapshot was taken, and the timestamped match results are stored in the database. Meanwhile, the online serving application maintains a cache of campaign change timestamps. Whenever serving receives an offline-generated member-campaign match result pair for expansion, it retrieves the timestamped match results, analyzes the two timestamps (i.e., the timestamp on the online result and the timestamp for the offline result), and invalidates the offline result if the offline timestamp predates the online.

Embodiments of the present disclosure may perform a campaign selection process in conjunction with the audience identification (220) in order to identify a subset of the content distribution campaigns that would benefit the most from audience expansion. In some exemplary embodiments, the campaign selection includes a series of heuristic rules evaluating the suitability of audience expansion for a campaign. These rules may be checked, for example, each time the system performs the offline workflow (see FIG. 2B and above). For any campaigns that do not satisfy the rules, audience expansion may be omitted. Accordingly, a subset of content items that may be displayed to an audience of users may be selected based on one or more of: the user's profile attributes, the size of the audience, and a cost associated with displaying the subset of content items to the audience.

Displaying the content based on cost may consider a budget for the content distribution campaign. For example, campaigns matched with users may compete in a generalized second price auction, where their predicted click-through rate (CTR) and bid jointly determine a rank order, and each campaign's cost is determined by the next-ranked campaign. The winning content can then be sent to the frontend to be displayed/served to the targeted users (230). This workflow is illustrated in the online processes (colored in dark grey) in FIG. 5.

Each campaign may optionally set a daily budget, and once the budget is spent the campaign no longer participates in the remaining auctions that day. In addition, to prevent campaigns from spending their entire budget early in the day, the ad serving system implements a pacing algorithm that randomly removes the campaign from some auctions if it is predicted that the campaign is on pace to exceed its budget. Thus, in a given period a campaign may match M requests, but only participate in N<M auctions due to pacing or having spent its budget.

For example, for a campaign that has not yet enabled audience expansion, if the ratio of the paced request r=N/M is significantly less than 1 over a time period (e.g., the past week) it may be concluded that the campaign has no trouble spending its budget using its original targeting and would not benefit from expansion. By contrast, for a campaign that has enabled expansion, M may be partitioned into $M_{exact}$ and $M_{expanded}$, the number of requests matched due to exact and expanded matching, respectively. The system may determine if $r=N/M_{exact}$ is significantly less than 1 over the past week to evaluate the benefit of expansion for the campaign. Expanded matches may be excluded such that if a campaign is only able to hit its budget due to expansion, the system will continue to perform expansion, rather than oscillate between turning expansion on and off.

Embodiments of the present disclosure may utilize a campaign-agnostic process, a campaign-aware process, or a combination of the two in expanding the audience for content. In some exemplary embodiments, in the campaign-agnostic framework, profile attribute expansion is achieved by analyzing a set of targetable profile attributes. Any attribute or "entity" of interest may be so analyzed, such as company, group, skill, job title, etc.

For example, the skill of "Data Mining" may be identified as being similar to "Big Data" and "Machine Learning." Applying this in profile attribute expansion, now anyone with an explicit "Data Mining" skill will be eligible to see ads targeting "Big Data" and "Machine Learning." In some embodiments, analysis of the user attributes includes using a logistic regression model that takes as input features representing involved entities, and outputs a score aimed at capturing the similarity between the entities learned from historical interaction data.

Campaign-agnostic expansion provides an always-available expansion mechanism that does not require warm-up from the time a campaign is created or expansion is enabled. However, campaign-agnostic expansion may have a relatively coarse quality of expansion carried out on a per-attribute basis. The campaign-aware expansion can be used to take the whole user profile into consideration and is hence more precise. However, the tradeoff is that it may take some time for the offline process to generate the expansion, so the expansion may not be available in the short period after a campaign becomes active.

In the campaign-aware framework, targeting by content providers may be referred to as "labeling" users; i.e., an advertiser's campaign emits labels for users belonging to the desired audience. The embodiments of the present disclosure may be used to predict whether or not an untargeted user should be included in the audience for a given campaign. However, choosing positive and negative training examples in such cases may be problematic. Labeling targeted users as positive and non-targeted users as negative could simply result in training a model of the original targeting. Waiting until the campaign has run for a while and collecting labels based on users' interactions, on the other hand, may take a prolonged warm-up time for model training, and may require some careful setup to effectively explore-exploit the search space.

Accordingly, some embodiments of the disclosure may employ a nonparametric method and reduce the problem to nearest neighbor search. This not only simplifies the label gathering process, but also avoids any assumptions that the exact targeted audience is drawn from any distribution or mixture of distributions. A similarly measure may be defined in conjunction with the nearest neighbor search. The system may perform an analysis that models user similarity and retrieve similar users for a given user based on similar profiles.

The workflow of audience expansion using similar profiles expansion is depicted in the box labeled "Campaign-Aware Expansion" in FIG. 2B, which includes: "Offline Match:" calculating the exact target audiences for content distribution campaigns that have enabled audience expansion by applying their targeting criteria in batch mode—the output is the campaigns' "Exact Audiences"; "Filter campaigns:" removal of campaigns that are unlikely to benefit from lookalike modeling, such as campaigns that target very broadly or that can easily spend their budget without expansion; "Similar Profiles Lookalike Expansion:" where the exact audiences are expanded to similar users, with the help of a "similar profiles" algorithm (described in more detail below); "Post-expansion Filters:" where additional filters are applied to the expanded audience, such as those to make the new audience comply to campaigns' negative targeting criteria, or to restrict expansion on certain attributes (e.g., location and gender). It should be noted that click-through rate (CTR) prediction and auction ranking may apply to expanded campaigns, CTR prediction models may use features indicating whether a campaign matches as a result of the audience expansion process of the present disclosure. CTR prediction can thus act as a safeguard against showing low-relevance content to users due to such expansion. The output of the preceding components of the "Campaign-Aware Expansion" is the "Lookalike Audiences" for selected campaigns, which can be grouped by member II) in order to merge easily with the online process, which may be pushed to a key-value store.

As mentioned above, campaign-agnostic expansion may provide a more readily available mechanism but can be relatively less precise than campaign-aware expansion. The campaign-aware expansion, on the other hand, may require time to process offline but can be much finer grained due to the utilization of all profile information. Embodiments of the present disclosure may be adapted to utilize a complementary design of these two expansion processes to employ a hybrid method that includes both the campaign-agnostic and campaign-aware methods, combining the strengths and offsetting the weaknesses of each.

The synergy in the hybrid method can be achieved by the campaign-agnostic and campaign-aware expansion frameworks generating outputs in the same member-oriented fashion. In one example, the output of campaign-agnostic expansion is an enriched member profile, Up={A*1, A*2 . . . }, where A*i is an expanded profile attribute. The output of the campaign-aware expansion is a list of predicted campaigns, Ul:={C1, C2, . . . }, where each Ci is a campaign that does not target the member, but should. The enriched profile is used in the online target matching process, the output of which is then directly merged with the list of predicted campaigns as shown in the "Merge" block of FIG. 2B. This design also provides a straightforward way to conduct A/B tests by selectively making either Up or Ul available in the ads serving flow. If both Up and Ul are made available and utilized, this effectively achieves the hybrid method for expansion.

Entity similarity may be modeled through a content-based filtering approach. By treating each entity as a document to be compared against a collection of other entities, embodiments of the present disclosure may employ a search-based system to find the best-matching entities.

Denote as X the value space for a given entity type. The problem can be defined as a mapping X→Pκ(X), where Pκ(X) denotes the powerset of X of cardinality less than κ. Specifically, the Similar-X framework outputs a list of κ target entities t1, t2, . . . , tκ rank-ordered by the similarity scores with regard to the source entity.

Retrieving fields for entities to obtain an expressive representation is described in more detail above. In some exemplary embodiments, the fielded document representation of an entity is treated as a query and run against an inverted index of documents generated offline to retrieve similar documents. A vector space model (VSM) is used to represent fields in documents and queries as weighted vectors in a multi-dimensional space, where each distinct term is a dimension, and tf-idf values are used as the term weights. The VSM may be used to identify one or more additional users for the expanded audience for content based on the number of similar attributes between the user and additional users and based on the weighting of such attributes. The VSM similarity between a field fs in the source entity (query) and a field ft in the target entity (document) is the Cosine Similarity:

s(fs, ft)=V(fs)·V(ft)/|V(fs)||V(ft)|, where V(·) denotes the VSM representation of a field, and will be omitted where there is no confusion.

Note that fs and ft can be different fields from the two entities. For example, comparing the past job title from a source member to the current job title of a target member does tell us something useful about the similarity between these two members. In general, two fields can be compared where the terms of the fields (values in the vector space) are of the same type. Specifically, denote as F the field space of an entity. We can categorize fields based on the type of their term values, which can be either texts (mostly found in n-gram/phrase fields), or IDs (mostly found in standardized, derived, and proximity fields). Denote textual fields as T and ID fields as I. It follows that F=T ∪I.

Denote as G={Fs, Ft, E} the bipartite graph between a source and a target entity, in which an edge (fs, ft)∈E if and only if both fs and ft are of the same term types, i.e.: E={(fs, ft):(fs, ft)∈T×T ∨(fs, ft)∈I×I}. We use s={s(fs, ft): ∀(fs, ft)∈E} to denote the field based similarities when s(·) is applied to all edges in E.

Given the field similarities, we can characterize the final entity similarity so that it matches the following intuitions: 1) two entities are similar if there are a large number of similar fields; and 2) different fields contribute differently to the final entity similarity. We may define the entity similarity as a weighted linear combination: S(s, t)=wT s.

The coefficients w can be learned from the historical user-entity interaction log. For example, we take pairs of companies that have been historically co-targeted frequently in content as positive examples, and companies frequently ignored when recommended to content providers for inclusion given their existing company targetings as negative examples. We may then fit a logistic regression model with elastic net regularization to the training data.

Embodiments of the present disclosure may utilize a personalization scheme to rerank each potentially expandable entity with regard to a given user. We achieve the personalization by employing a learned propensity model to score user-entity pairs. For each user and each entity type x∈X, we select the top kx results from the available similarity results.

Taking companies as an example, to build the user-company propensity model, the features for users and companies may be extracted as described above with reference to step (210). Training examples may be gathered from historical user-company interactions, for example, a user following a company as a positive example and un-following as negative. A logistic regression model is then trained from these examples.

In some embodiments, a Locality Sensitive Hashing (LSH) technique (such as ARCOS) to assist in finding members with high cosine similarity. Among other things, using the LSH technique helps determine similarities of members with large amounts of member data. In such cases, each member is mapped to one of 2n clusters, where n is chosen to make our nearest neighbor search manageable. This cluster is built into the member index; this speeds up the subsequent nearest neighbor search because we can re-strict our search to members in the same cluster. A member's cluster is specified by n hits, where each bit is determined by the output of a particular hash function, To obtain each hash function a random vector r∈R|F| is chosen with each component drawn from a Gaussian distribution N(0, 1). The hash function corresponding to the vector r is defined as hr(u):=sign(r·u), which effectively partitions the space into two half-spaces by a randomly chosen hyperplane. The probability of collision is P r,[h,(u)=h,(v)]=1−θ(u, v)/π, where θ measures the angle between two vectors. It can be shown that 1−θ/π is closely related to the function cos(θ). Thus, members with high cosine similarity are likely to be assigned to the same cluster.

As mentioned above, the determination of similarities between entities in some exemplary embodiments may be carried out by treating a source entity as a query and performing nearest neighbor search against an index of target documents. The search takes a model configuration that specifies the coefficients used in the entity similarity function.

For campaign-agnostic expansion, a faceted search may be used to achieve personalized similarity results reranking based on member-entity propensity scores, in which case the member profile in the VSM representation may act as a query against the entity index, with the pool of entities to rank being a facet in the search.

In some exemplary embodiments, for campaign-aware expansion the system may first search, for each member in the original targeted audience, for the top kp similar members using similarity results. The found members are then considered candidates to be included in the campaign's expanded audience. The number of expanded campaigns for each member can be set to be less than a threshold to prevent over-competition on a single member and to control scalability (longer lists incur non-trivial inter-process communication cost). To achieve, in some exemplary embodiments, a heuristical member-campaign fitness score F is derived between a member m and a campaign c, as shown in the following equation:

$$F(m,c)=\Sigma m' \in T(c) S(m,m')/\sqrt{|T(c)|}$$

In some exemplary embodiments, after the expanded audience is generated offline, additional filtering is applied to help ensure the audience does not include any users that are negatively targeted by the content provider. The system may also exclude audience members based one various targeting attributes, such as location and gender, particularly in cases where particular attributes (such as location and gender) are highly specific to a content distribution campaign (e.g., such as a marketing campaign for advertising content), and if they are specified they may be viewed as stronger and more exclusive preferences than other targeting attributes (e.g., skill or title).

In addition, as an extra measure to protect content providers from increased costs due to expanding the audience, the most expensive members (i.e., the users to whom presenting the content represents the highest cost) from the expanded audiences. In such cases, a regression model may be fitted to predict the bid distribution of a user based on his/her targeting attributes, where the response variable is the log bid, and the explanatory variables are the member's targeting attributes in X:

$$Y=\log \text{Bid}=X\beta+\varepsilon, \varepsilon \sim N(0,\sigma 2).$$

In this example, after we fit the linear regression with coefficient estimate the mean log bid $\mu$ for member i as $\mu i = x i \beta^*$. Given this, we can rank order an expanded audience by $\mu$ and re-move the top p % most expensive members.

In some exemplary embodiments, the system may be adapted to automatically evaluate the performance of the audience expansion functionality and modify various parameters in response. In one example, the quality of expanded audiences can be compared with the original targeted audiences by determining a metric based on connection density to measure how uniform an audience is: In this example, if we treat the connection graph for a given audience as an undirected simple graph, then the density is defined as:

$$D=2|C|/|M|(|M|-1)$$

where |C| is the number of connections, and |M| is the number of members in the audience.

Additionally, as described above, campaign-aware expansion may compute a similarity score for each user in the expanded audience by summing the similarity score between that user and all users in the original audience. To determine whether similarity to the original audience is a reasonable predictor of user interest, embodiments of the present disclosure may automatically analyze the relationship between this score and clickthrough rates.

In some exemplary embodiments, for each impression shown to a user in a campaign's expanded audience, we look up the similarity score given to that user and then compute the quantile of this score among all of this campaign's impressions. Then, we consider only impressions where the quantile exceeds some threshold and determine the CTR for this subset of expanded impressions. Accordingly, we can estimate what the CTR of all expanded impressions would have been if, for each campaign, we had only expanded to users with scores above a given quantile for that campaign.

Referring again to FIG. 2A, content may be displayed (230) to any or all of the users in an original or expanded audience. For example, various content may be presented to users in the respective social network feed for each user, such as articles containing different media formats (e.g., text, images, video, etc.), job postings, news stories, recommendations (e.g., to view content such as articles, suggestions to connect with other members of the social network, etc. and updates (e.g., on the status of a user's friends in the social network).

Figure 3:
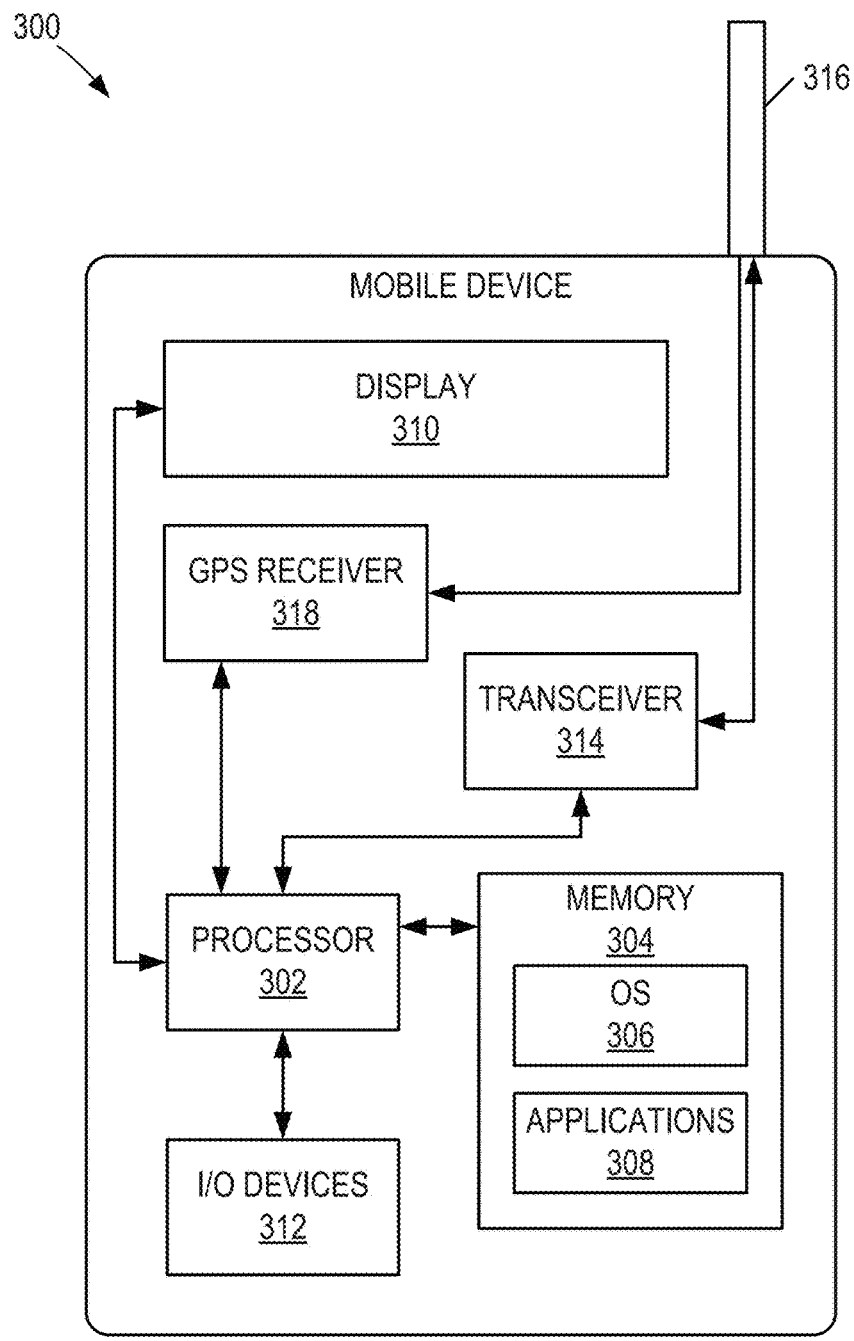
FIG. 3 is a block diagram illustrating an exemplary mobile device.

FIG. 3 is a block diagram illustrating a mobile device 300, according to an exemplary embodiment. The mobile device 300 may include a processor 302. The processor 302 may be any of a variety of different types of commercially available processors 302 suitable for mobile devices 300 (for example, an XScale architecture microprocessor, a microprocessor without interlocked pipeline stages (MIPS) architecture processor, or another type of processor 302). A memory 304, such as a random access memory (RAM), a flash memory, or other type of memory, is typically accessible to the processor 302. The memory 304 may be adapted to store an operating system (OS) 306, as well as application programs 308, such as a mobile location enabled application that may provide LBSs to a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 may be coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a GPS receiver 318 may also make use of the antenna 316 to receive GPS signals.

Certain embodiments may be described herein as including logic or a number of components, modules, or mechanisms. Modules may constitute either software modules code embodied (1) on a non-transitory machine-readable medium or (2) in a transmission signal) or hardware-implemented modules. A hardware-implemented module is a tangible unit capable of performing certain operations and may be configured or arranged in a certain manner. In exemplary embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules), In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some exemplary embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Exemplary embodiments may be implemented in digital electronic circuitry, or in computer hardware, firmware, software, or in combinations of them. Exemplary embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In exemplary embodiments, operations may be performed by one or more programmable processors executing a computer program to perform functions by operating on input data and generating output, Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 4:
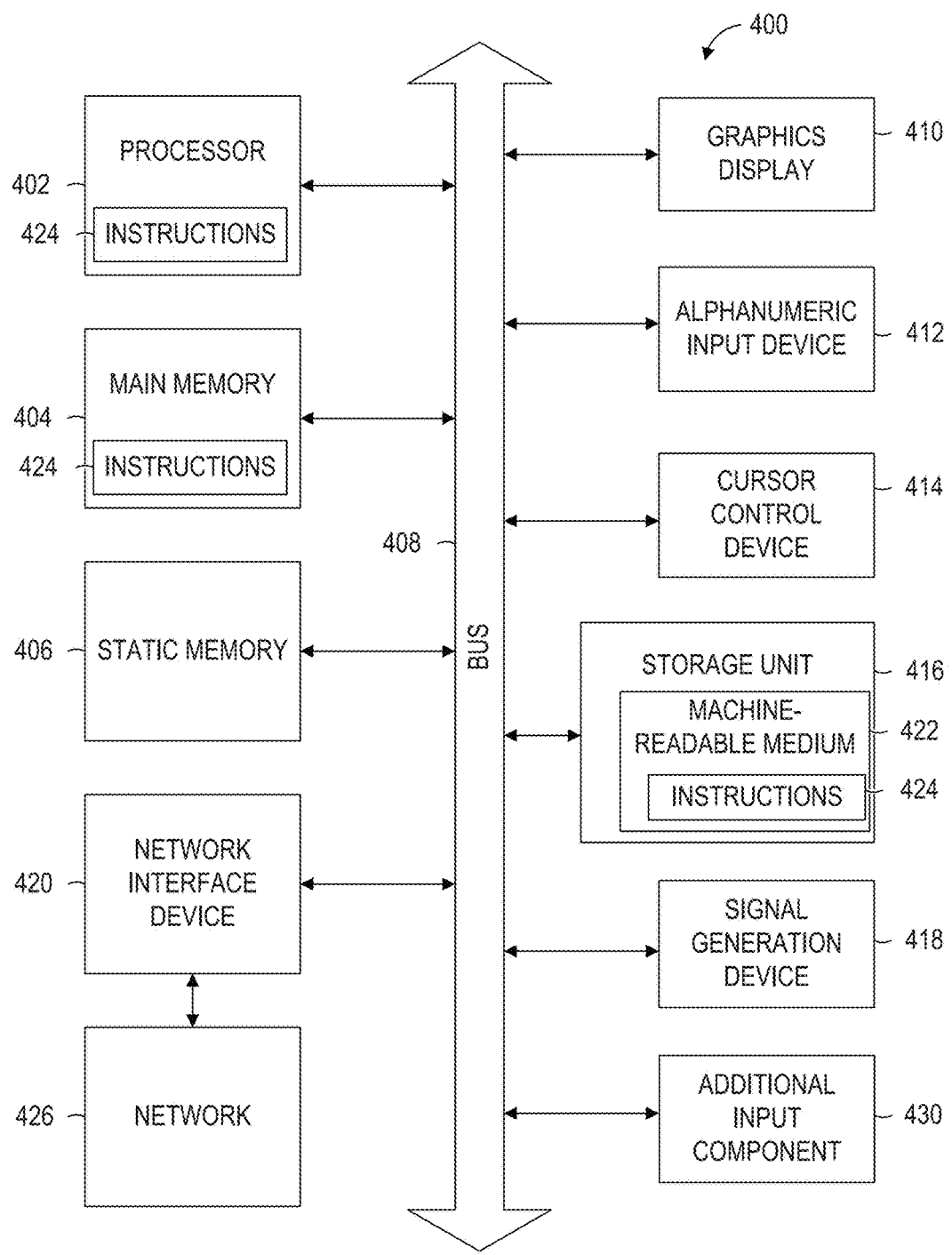
FIG. 4 is a block diagram illustrating components of an exemplary computer system.

FIG. 4 is a block diagram illustrating components of a machine 400, according to some exemplary embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system within which the instructions 424 (e.g., software, a program, an application, an applet, or other executable code) for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 426 via the network interface device 420. For example, the network interface device 420 may communicate the instructions 424 using any one or more transfer protocols (e.g., hypertext transfer protocol (HTTP)).

In some exemplary embodiments, the machine 400 may be a portable computing device, such as a smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an exemplary embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A method comprising:
in an offline mode:
retrieving, by a computer system from a database in communication with the computer system, attributes of a user of an online network from a profile of the user;
matching content for display within an Internet web page of the online network to the user based on the user's profile attributes;
identifying, by the computer system, an audience for the content, wherein identifying the audience for the content includes adding the user to the audience based on the matching of the content to the user based on the user's profile attributes;
expanding the audience for the content, by the computer system, by adding one or more additional users to the audience based on results from a vector space model identifying one or more similarities between the one or more additional users and the user from the user's profile attributes, the vector space model representing fields in user profiles as weighted vectors in a multi-dimensional space, where each distinct term in a member profile is a dimension and a term-frequency-inverse document frequency (TF-IDF) value for a given term is used as a term weight for the given term;
storing the audience in a database along with a timestamp indicative of the time in which the matching occurred;
in an online mode:
receiving, by the computer system, a request to display content; and
receiving a change to a campaign corresponding to the audience;
storing a timestamp indicative of the time the change was received;
displaying, by the computer system, the content to the user within the Internet web page of the online network, based upon a comparison of the timestamp indicative of the time in which the matching occurred and the timestamp indicative of the time the change was received.

2. The method of claim 1, wherein receiving the request for content includes receiving targeting information from a provider of the content, and wherein matching the content to the user includes matching the targeting information with the user's profile attributes.

3. The method of claim 2, wherein the targeting information includes one or more of: a job title, a skill, a topic, an organization, an organization size, demographic information, behavioral information, and location information.

4. The method of claim 1, wherein retrieving the attributes of the user includes adding a set of additional attributes to the attributes from the user's profile, and wherein matching the content to the user is based on the attributes from the user's profile and the additional attributes.

5. The method of claim 1, wherein coefficients of the vector space model are learned from an historical user-entity interaction log.

6. The method of claim 1, wherein receiving the request for content includes selecting additional content for display to the user, and wherein identifying the audience for the content includes matching the user to the requested content and the additional content.

7. The method of claim 1, wherein the analysis includes:
determining that targeting information received from a provider of the content has a timestamp that is prior to the timestamp of the audiences.

8. The method of claim 7, wherein matching the content to the user comprises including or excluding one or more timestamped match results based on a respective timestamp on each of the one or more timestamped match results.

9. The method of claim 1, wherein the request for content includes a request for a plurality of content items, and wherein identifying the audience for the content includes selecting a subset of the plurality of content items for display to the audience based on one or more of: the user's profile attributes, a size of the audience, and a cost associated with displaying the subset of the content items to the audience.

10. The method of claim 1, wherein expanding the audience for the content includes performing a local sensitive hashing function to identify the one or more additional users having a cosine similarity to the user above a predetermined threshold.

11. The method of claim 1, wherein the one or more additional users are identified from the vector space model based on a number of similar attributes between the one or more additional users and the user and a weighting of the similar attributes between the one or more additional users and the user.

12. The method of claim 1, wherein expanding the audience for the content includes ranking the one or more additional users using a learned propensity model.

13. The method of claim 1, wherein expanding the audience for the content includes calculating a fitness level between the one or more additional users and the content and adding the one or more users to the audience based on the respective fitness level associated with each respective additional user.

14. The method of claim 1, wherein adding the one or more additional users to the audience is based on a predicted uniformity of the expanded audience, the predicted uniformity based on a size of the expanded audience in comparison to a size of the audience and a density of the expanded audience in comparison to a density of the audience.

15. The method of claim 1, wherein attributes for a plurality of users are retrieved from a respective plurality of profiles in the database, and wherein identifying the audience for the content includes including or excluding each respective user of the plurality of users from the audience based on matching the content to each respective user.

16. The method of claim 15, wherein identifying the audience includes excluding a user from the plurality of users from the audience based on one or more of: a gender of the excluded user, a location of the excluded user, and a cost to display the content to the excluded user.

17. The method of claim 16, wherein identifying the audience includes excluding one or more users from the plurality of users based on performing a linear regression to determine the cost to display the content to the one or more excluded users exceeds a predetermined threshold.

18. The method of claim 15, wherein identifying the audience includes generating a list of users in the audience identified by a respective user identifier, and wherein displaying the content includes displaying the content to each respective user in the audience via a respective social network feed for the respective user.

19. A system comprising:
a processor; and
memory coupled to the processor and storing instructions that, when executed by the processor, cause the system to perform operations comprising:
in an offline mode:
retrieving, by a computer system from a database in communication with the computer system, attributes of a user of an online network from a profile of the user;
matching content for display within an Internet web page of the online network to the user based on the user's profile attributes;
identifying, by the computer system, an audience for the content, wherein identifying the audience for the content includes adding the user to the audience based on the matching of the content to the user based on the user's profile attributes;
expanding the audience for the content, by the computer system, by adding one or more additional users to the audience based on results from a vector space model identifying one or more similarities between the one or more additional users and the user from the user's profile attributes, the vector space model representing fields in user profiles as weighted vectors in a multi-dimensional space, where each distinct term in a member profile is a dimension and a term-frequency-inverse document frequency (TF-IDF) value for a given term is used as a term weight for the given term;
storing the audience in a database along with a timestamp indicative of the time in which the matching occurred;
in an online mode:
receiving, by the computer system, a request to display content; and
receiving a change to a campaign corresponding to the audience;
storing a timestamp indicative of the time the change was received;
displaying, by the computer system, the content to the user within the Internet web page of the online network, based upon a comparison of the timestamp indicative of the time in which the matching occurred and the timestamp indicative of the time the change was received.

20. A tangible, non-transitory computer-readable medium storing instructions that, when executed by a computer system, cause the computer system to perform operations comprising:
in an offline mode:
in an offline mode:
retrieving, by a computer system from a database in communication with the computer system, attributes of a user of an online network from a profile of the user;
matching content for display within an Internet web page of the online network to the user based on the user's profile attributes;
identifying, by the computer system, an audience for the content, wherein identifying the audience for the content includes adding the user to the audience based on the matching of the content to the user based on the user's profile attributes;
expanding the audience for the content, by the computer system, by adding one or more additional users to the audience based on results from a vector space model identifying one or more similarities between the one or more additional users and the user from the user's profile attributes, the vector space model representing fields in user profiles as weighted vectors in a multi-dimensional space, where each distinct term in a member profile is a dimension and a term-frequency-inverse document frequency (TF-IDF) value for a given term is used as a term weight for the given term;
storing the audience in a database along with a timestamp indicative of the time in which the matching occurred;
in an online mode:
receiving, by the computer system, a request to display content; and
receiving a change to a campaign corresponding to the audience;
storing a timestamp indicative of the time the change was received;
displaying, by the computer system, the content to the user within the Internet web page of the online network, based upon a comparison of the timestamp indicative of the time in which the matching occurred and the timestamp indicative of the time the change was received.

* * * * *

UNITED STATES PATENT AND TRADEMARK OFFICE
CERTIFICATE OF CORRECTION

PATENT NO. : 11,188,950 B2
APPLICATION NO. : 15/253702
DATED : November 30, 2021
INVENTOR(S) : Liu et al.

Page 1 of 1

It is certified that error appears in the above-identified patent and that said Letters Patent is hereby corrected as shown below:

In the Claims

In Column 24, Lines 9-10, in Claim 20, delete:
"in an offline mode:
in an offline mode:"
And insert:
--in an offline mode:-- therefor Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*